(12) United States Patent
Malina (10) Patent No.: US 8,749,905 B1
(45) Date of Patent: Jun. 10, 2014

(54) DEFECT SCANNING FOR A DISK DRIVE

(75) Inventor: James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 100 days.

(21) Appl. No.: 13/414,008

(22) Filed: Mar. 7, 2012

(51) Int. Cl.
*G11B 27/36* (2006.01)
(52) U.S. Cl.
USPC .................... 360/31; 360/53; 360/55; 360/60

(58) Field of Classification Search
None
See application file for complete search history.

(56) References Cited

U.S. PATENT DOCUMENTS 8,045,281 B2 * 10/2011 Cho et al. .................. 360/31
8,411,386 B2 * 4/2013 Hongawa et al. .......... 360/55

* cited by examiner

*Primary Examiner* — Muhammad N Edun (57) ABSTRACT

Apparatus and methods for performing defect scanning on a disk drive which includes a disk constructed to have tracks written on the disk for storing data. Test data is concurrently written in more than one track on the disk and the data written to the more than one track is read to detect defects on the disk.

20 Claims, 8 Drawing Sheets

Write

| Sector | | | | | | | | | | | | |
|---|---|---|---|---|---|---|---|---|---|---|---|---|
| Track 0 | 0 | 1 | 2 | 3 | 4 | 5 | 6 | 7 | 8 | 9 | ... | ... | max |
| Track 1 | 0 | 1 | 2 | 3 | 4 | 5 | 6 | 7 | 8 | 9 | ... | ... | max |
| Track 2 | 0 | 1 | 2 | 3 | 4 | 5 | 6 | 7 | 8 | 9 | ... | ... | max |
| Track 3 | 0 | 1 | 2 | 3 | 4 | 5 | 6 | 7 | 8 | 9 | ... | ... | max |
| Track 4 | max - 1 | max | 0 | 1 | 2 | 3 | 4 | 5 | 6 | 7 | ... | ... | ... |
| Track 5 | max - 1 | max | 0 | 1 | 2 | 3 | 4 | 5 | 6 | 7 | ... | ... | ... |
| Track 6 | max - 1 | max | 0 | 1 | 2 | 3 | 4 | 5 | 6 | 7 | ... | ... | ... |
| Track 7 | max - 1 | max | 0 | 1 | 2 | 3 | 4 | 5 | 6 | 7 | ... | ... | ... |
| Track 8 | max - 3 | max - 2 | max - 1 | max | 0 | 1 | 2 | 3 | 4 | 5 | ... | ... | ... |
| Track 9 | max - 3 | max - 2 | max - 1 | max | 0 | 1 | 2 | 3 | 4 | 5 | ... | ... | ... |
| Track 10 | max - 3 | max - 2 | max - 1 | max | 0 | 1 | 2 | 3 | 4 | 5 | ... | ... | ... |
| Track 11 | max - 3 | max - 2 | max - 1 | max | 0 | 1 | 2 | 3 | 4 | 5 | ... | ... | ... |
| Track 12 | max - 5 | max - 4 | max - 3 | max - 2 | max - 1 | max | 0 | 1 | 2 | 3 | ... | ... | ... |
| Track 13 | max - 5 | max - 4 | max - 3 | max - 2 | max - 1 | max | 0 | 1 | 2 | 3 | ... | ... | ... |
| Track 14 | max - 5 | max - 4 | max - 3 | max - 2 | max - 1 | max | 0 | 1 | 2 | 3 | ... | ... | ... |
| Track 15 | max - 5 | max - 4 | max - 3 | max - 2 | max - 1 | max | 0 | 1 | 2 | 3 | ... | ... | ... |

Group 1: Tracks 0–3
Group 2: Tracks 4–7
Group 3: Tracks 8–11
Group 4: Tracks 12–15

FIG. 4A

Read

| Sector | | | | | | | | | | | | |
|---|---|---|---|---|---|---|---|---|---|---|---|---|
| Track 0 | 0 | 1 | 2 | 3 | 4 | 5 | 6 | 7 | 8 | 9 | ... | ... | max |
| Track 1 | 0 | 1 | 2 | 3 | 4 | 5 | 6 | 7 | 8 | 9 | ... | ... | max |
| Track 2 | 0 | 1 | 2 | 3 | 4 | 5 | 6 | 7 | 8 | 9 | ... | ... | max |
| Track 3 | 0 | 1 | 2 | 3 | 4 | 5 | 6 | 7 | 8 | 9 | ... | ... | max |
| Track 4 | max - 1 | max | 0 | 1 | 2 | 3 | 4 | 5 | 6 | 7 | ... | ... | ... |
| Track 5 | max - 1 | max | 0 | 1 | 2 | 3 | 4 | 5 | 6 | 7 | ... | ... | ... |
| Track 6 | max - 1 | max | 0 | 1 | 2 | 3 | 4 | 5 | 6 | 7 | ... | ... | ... |
| Track 7 | max - 1 | max | 0 | 1 | 2 | 3 | 4 | 5 | 6 | 7 | ... | ... | ... |
| Track 8 | max - 3 | max - 2 | max - 1 | max | 0 | 1 | 2 | 3 | 4 | 5 | ... | ... | ... |
| Track 9 | max - 3 | max - 2 | max - 1 | max | 0 | 1 | 2 | 3 | 4 | 5 | ... | ... | ... |
| Track 10 | max - 3 | max - 2 | max - 1 | max | 0 | 1 | 2 | 3 | 4 | 5 | ... | ... | ... |
| Track 11 | max - 3 | max - 2 | max - 1 | max | 0 | 1 | 2 | 3 | 4 | 5 | ... | ... | ... |
| Track 12 | max - 5 | max - 4 | max - 3 | max - 2 | max - 1 | max | 0 | 1 | 2 | 3 | ... | ... | ... |
| Track 13 | max - 5 | max - 4 | max - 3 | max - 2 | max - 1 | max | 0 | 1 | 2 | 3 | ... | ... | ... |
| Track 14 | max - 5 | max - 4 | max - 3 | max - 2 | max - 1 | max | 0 | 1 | 2 | 3 | ... | ... | ... |
| Track 15 | max - 5 | max - 4 | max - 3 | max - 2 | max - 1 | max | 0 | 1 | 2 | 3 | ... | ... | ... |

DEFECT SCANNING FOR A DISK DRIVE

BACKGROUND

A disk in a disk drive is coated with a magnetic material which is magnetized with a write element (e.g. write coil) in order to write data onto the surface of the disk. Various influences may render portions of the disk surface defective. Such influences may include, for example, if the magnetic coating is not evenly applied to the disk surface or if a particle contaminates the magnetic coating.

During a defect scanning procedure performed by a disk drive manufacturer, the disk drive is connected to a test system and defective areas of the disk and certain areas adjacent the defective areas (i.e., unusable areas) are located and "mapped out" so that they are not used during normal operation of the disk drive. A conventional defect scanning procedure performed by a manufacturer typically involves sequentially writing and reading all of the tracks on the disk to identify defects on the disk. With current disk drives having disks with tens of thousands of tracks, the foregoing defect scanning procedure is very time consuming.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

DETAILED DESCRIPTION

In the following detailed description, numerous specific details are set forth to provide a full understanding of the present disclosure. It will be apparent, however, to one ordinarily skilled in the art that the various embodiments disclosed may be practiced without some of these specific details. In other instances, well-known structures and techniques have not been shown in detail to avoid unnecessarily obscuring the various embodiments.

Figure 1:
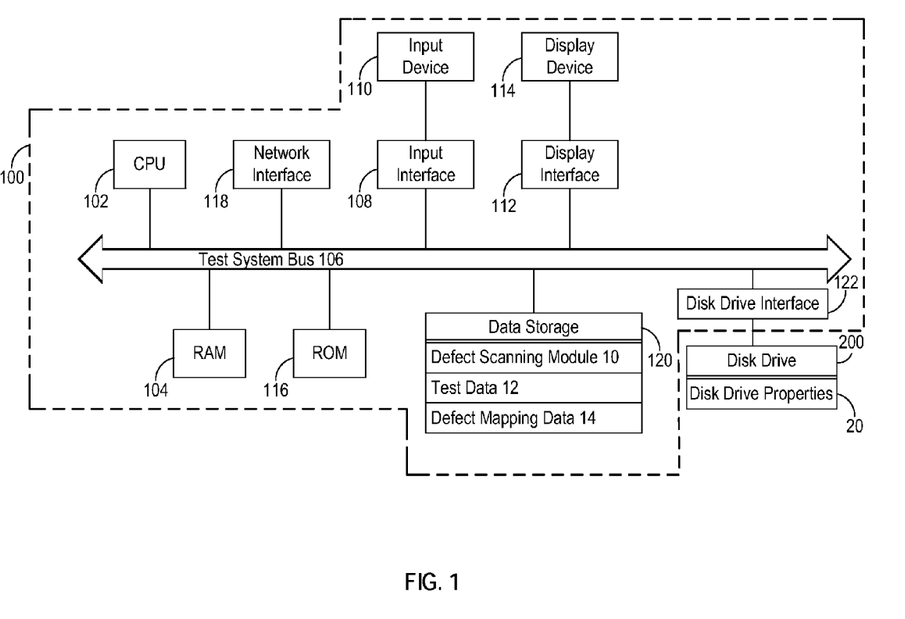
FIG. 1 is a block diagram depicting a test system connected to a disk drive according to an embodiment.

FIG. 1 shows test system 100 connected to disk drive 200. The arrangement depicted in FIG. 1 can be part of a manufacturing process for disk drive 200 where a disk of disk drive 200 is checked for defects. Those of ordinary skill in the art will appreciate that the various disclosed embodiments are not limited to a manufacturer's scanning process performed with a test system. For example, alternative embodiments can include a self-test performed by a host computer after disk drive 200 has left the factory. Thus, the following description related to test system 100 may be applicable to such a host computer in some embodiments. In addition, alternative embodiments can include a self-test performed by disk drive 200 without a host computer or test system 100.

In the embodiment of FIG. 1, test system 100 includes central processing unit (CPU) 102 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 102 interfaces with test system bus 106. Also interfacing with test system bus 106 are random access memory (RAM) 104, input interface 108, display interface 112, read only memory (ROM) 116, network interface 118, data storage 120, and disk drive interface 122.

Input interface 108 interfaces with input device 110 which allows a user of test system 100 to enter information and commands to test system 100, or to allow a user to manipulate objects displayed on display device 114. Input device 102 can, for example, be a keyboard, scroll wheel, or pointing device.

Display interface 112 interfaces with display device 114 which displays information for a user of test system 100. In other embodiments, input device 110 and display device 114 can be combined into a single component, such as a touch-screen that displays objects and receives user input.

Data storage 120 can be, for example, a hard disk drive or a non-volatile solid state memory. As shown in FIG. 1, data storage 120 contains defect scanning module 10 which includes computer-executable instructions for performing a defect scanning process. Defect scanning module 10 may be configured as a part of an operating system, as a part of a device driver, or as a stand-alone application program. It may also be configured as a plug-in or dynamic link library (DLL) to the operating system, device driver or application program. Those of ordinary skill in the art will appreciate that the present disclosure is not limited to these embodiments and that the disclosed defect scanning module may be used in other environments in which defect scanning is used.

In an embodiment, data storage 120 also stores test data 12 which is sent to disk drive 200 via disk drive interface 122. In addition, data storage 120 may include defect mapping data 14 which indicates defective areas of a disk (i.e., disk 214 in FIG. 2) of disk drive 200. Defect mapping data 14 may also be stored in disk drive 200 after testing, as further described below. In one embodiment, in the case where the testing is conducted in the field by a host computer, defect scanning module 10 and test data 12 may be stored in a memory in disk drive 200 and retrieved for testing by a processor in the host computer.

In one embodiment, RAM 104 interfaces with test system bus 106 so as to provide information stored in RAM 104 to CPU 102 during execution of instructions in software programs such as defect scanning module 10. More specifically, in one embodiment, CPU 102 first loads computer-executable process steps from data storage 120 or another storage device into a region of RAM 104. CPU 102 can then execute the stored process steps from RAM 104. Data such as test data 12 and defect mapping data 14, or other information can be stored in RAM 104 so that the data can be accessed by CPU 102 during execution of software programs to the extent that such software programs have a need to access and/or modify the data.

As shown in FIG. 1, disk drive 200 is a device on which testing is conducted. Disk drive 200 interfaces with disk drive interface 122 of test system 100. Disk drive 200 contains disk drive properties 20 which identify the disk drive and indicate characteristics of disk drive 200 such as a default configuration for tracks on a disk (i.e., tracks 216 on disk 214 in FIG. 2) of disk drive 200.

Figure 2:
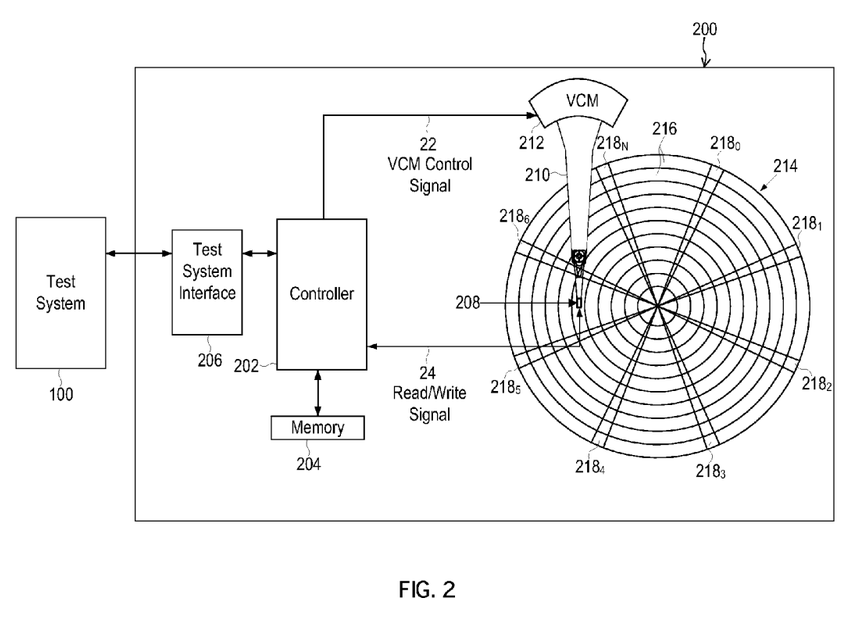
FIG. 2 is a block diagram depicting the disk drive of FIG. 1.

FIG. 2 illustrates a block diagram of disk drive 200 according to one embodiment. As shown in FIG. 2, disk drive 200 includes rotating magnetic disk 214 and head 208 connected to the distal end of actuator arm 210 which is rotated about a pivot by voice coil motor (VCM) 212 to position head 208 over disk 214. Head 208 includes at least a read element (i.e., read element 222 in FIG. 3) for reading data from disk 214, and a write element (i.e., write element 220 in FIG. 3) for writing tracks onto disk 214. Disk drive 200 also includes a spindle motor (not shown) for rotating disk 214 during read/write operations.

As shown in FIG. 2, disk drive 200 includes controller 202 which performs various operations of disk drive 200 described herein. Disk drive 200 also includes memory 204 and test system interface 206. Memory 204 can include a volatile memory, such as DRAM, and/or a non-volatile memory for storing data. Data stored in memory 204 includes data read from disk 214, data to be written to disk 214, translation tables for mapping a logical space to a physical disk space, and instructions for execution by controller 202 to perform the various functions of controller 202 described herein. Controller 202 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

Test system interface 206 is configured to interface disk drive 200 with test system 100 and may interface according to the serial advanced technology attachment (SATA) standard or other standards such as serial attached SCSI (SAS).

Disk 214 comprises a number of radial spaced, concentric tracks 216. Each track 216 is divided into a number of sectors that are spaced circumferentially along track 216. The sectors may be used to store user data and/or other information. Disk 214 also includes a plurality of angularly spaced servo wedges $218_0$-$218_N$, each of which may include embedded servo information that can be read from disk 214 by head 208 to determine the position of head 208 over disk 214. For example, each servo wedge $218_0$-$218_N$ may include a pattern of alternating magnetic transitions (servo burst), which may be read from disk 214 by head 208 and processed by controller 202 to estimate the position of head 208 relative to disk 214. The angular spacing between servo wedges $218_0$-$218_N$ may be uniform, as shown in the example of FIG. 2.

In operation, controller 202 writes data to and reads data from disk 214 in response to commands from test system 100 received via test system interface 206. When controller 202 receives a write command from test system 100 with test data 12 to be written to disk 214, controller 202 temporarily holds the received data in memory 204. To write test data 12 to disk 214, controller 202 positions head 208 on disk 214 by sending VCM control signal 22 (e.g., control current) to VCM 212. Controller 202 positions head 208 based on position information read from one or more servo wedges $218_0$-$218_N$. Controller 202 processes test data 12 to be written to disk 214 into write signal 24, which is output to head 208. For its part, a write element (shown as write element 220 in FIG. 3) of head 208 converts write signal 24 into a magnetic field that magnetizes the surface of the disk 214 based upon write signal 24, thereby magnetically writing test data 12 to disk 200. Controller 202 may notify test system 100 via test system interface 206 after test data 12 for the write command has been successfully written to disk 214.

When controller 202 receives a read command from test system 100, requesting data written on disk 214, controller 202 positions head 208 on disk 214 by sending VCM control signal 22 to VCM 212. A read element (shown as read element 222 in FIG. 3) of head 208 generates read signal 24 based upon the magnetization of the disk surface under head 208, and controller 202 processes read signal 24 into data. In an embodiment, the read data is temporarily held in memory 204 as part of a defect detection process which is described in more detail below with reference to FIG. 5C.

To increase the data storage capacity of disk 214, disk drive 200 has the capability to write data to disk 214 using shingled magnetic recording (SMR) so that tracks on disk 214 overlap. More specifically, write element 220 of head 208 is adapted for SMR which means that, among other things, it is wider than read element 222 of head 208. The non-overlapping portions of the overlapping tracks serve as narrow tracks that can be read by narrower read element 222 of head 208.

During a defect scanning process of the present disclosure, wider write element 220 is used to concurrently write test data 12 in more than one track 216 on disk 214. By concurrently writing test data 12 in more than one track 216, it is ordinarily possible to decrease the amount of time needed to perform a defect scanning process.

Figure 3:
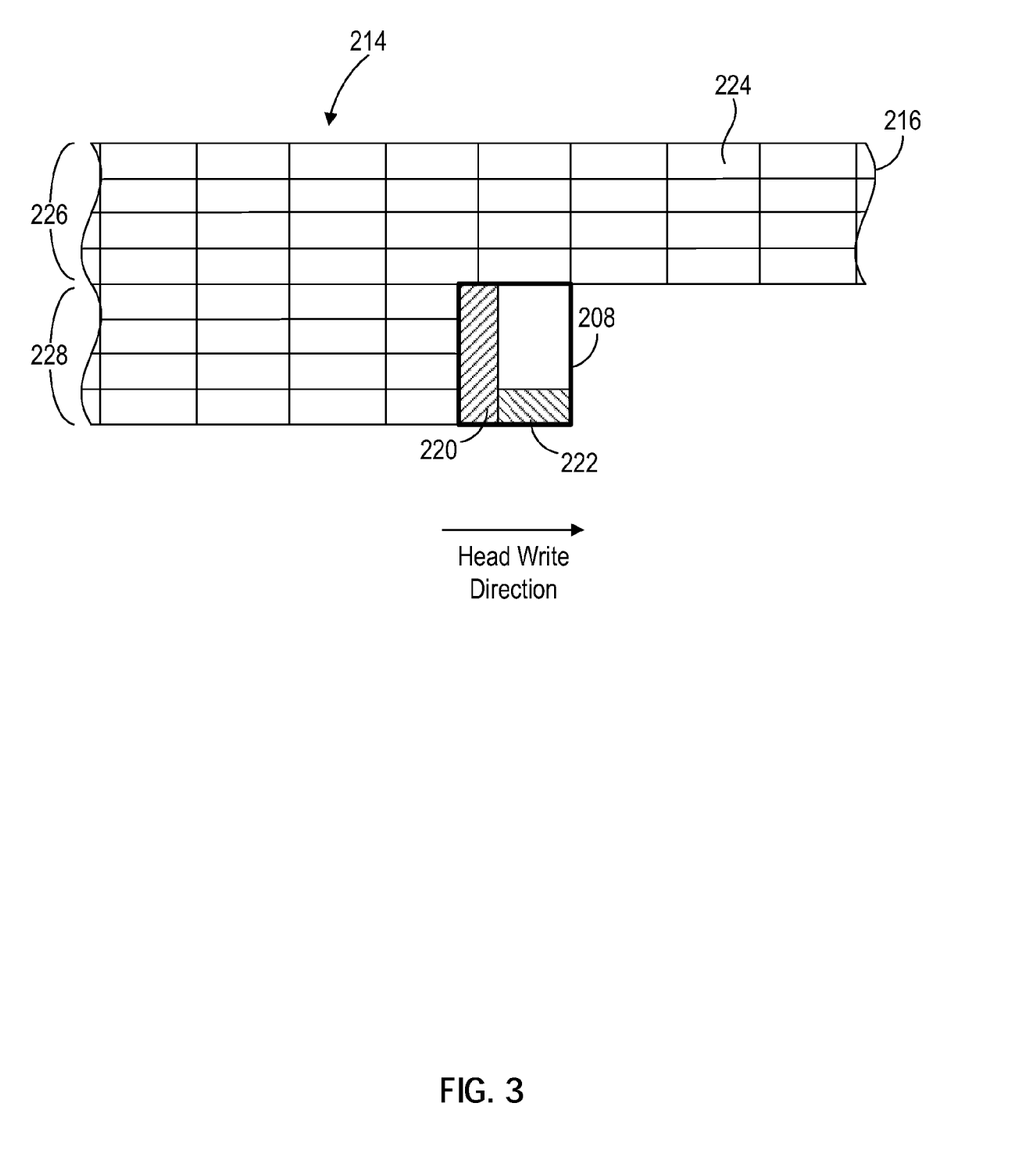
FIG. 3 illustrates a portion of a disk written by a head according to an embodiment.

In the example embodiment of FIG. 3, the width of write element 220 is equal to four tracks 216 of disk 214. Accordingly, during a defect scanning process, write element 220 of head 208 concurrently writes test data 12 in groups of four tracks, such as first group of tracks 226 and second group of tracks 228. In addition, each track 216 includes a plurality of sectors 224 for storing a fixed amount of data, such as 2,048 bits, 1,024 bits or 4,096 bits. As shown in FIG. 3, write element 220 is in the process of concurrently writing test data 12 in second group of tracks 228 in the direction indicated by the arrow for head write direction.

In alternative embodiments, the width of a write element is not limited to four tracks as shown in FIG. 3. For example, a write element can have a width of three tracks, five tracks, or other suitable number of tracks greater than one. In one embodiment, read element 222 reads back the written test data 12 one track at a time regardless of how many track are concurrently written. In this regard, Table 1 below shows a conceptual write time, read time, and total test time of a defect scanning process for different track widths of a write element.

TABLE 1

| Write Element Width | Write Time (1.00 Unit = baseline write time in a 1-track implementation) | Read Time (1.00 Unit = baseline read time in a 1-track implementation) | Total Test Time | Total Test Time Reduction |
|---|---|---|---|---|
| 1 Track | 1.00 | 1.00 | 2.00 | — |
| 2 Tracks | 0.50 | 1.00 | 1.50 | 25% |
| 3 Tracks | 0.33 | 1.00 | 1.33 | 33% |
| 4 Tracks | 0.25 | 1.00 | 1.25 | 38% |

Table 1 indicates a write time of 1.00 unit and a read time of 1.00 unit for a conventional write element having a width of one track. The total test time for writing test data 12 and reading the written data is then 2.00 units. In the case of a write element having a width of two tracks, the write time is half the time to write test data using a conventional write element having a width of one track. This is due to the write element writing test data 12 in two tracks at the same time. In the example of Table 1, the read time remains at 1.00 unit since read element 222 reads one track at a time, and the total test time for writing test data 12 and reading the written data is then 1.50 units. When compared to the total test time of 2.00 units required for a conventional head, there is a 25% reduction in the total test time. As shown by Table 1, as the width of the write element increases, the total test time decreases.

In addition to the integer track widths for a write element shown in Table 1, in some embodiments, a write element can also have a fractional track width. For example, in one embodiment, the width of a write element can be 2.5 tracks.

Figure 4A:
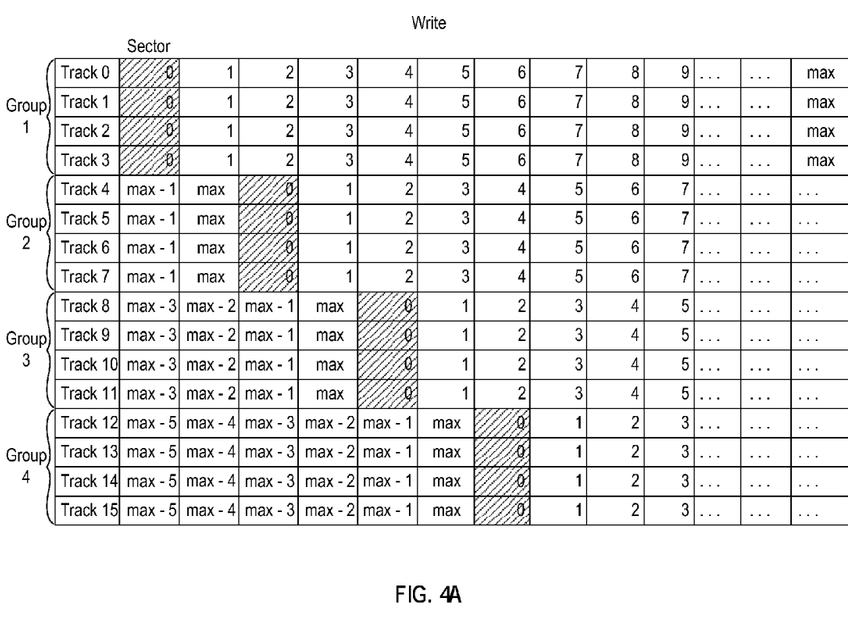
FIG. 4A illustrates a position of a write element according to an embodiment.

FIG. 4A illustrates the position of write element 220 during a write process of a defect scanning method according to one embodiment. A portion of disk 214 is depicted from track 0 to track 15. The sectors of the tracks shown in FIG. 4A are numbered with logical sector numbers in accordance with the order in which write element 220 writes test data 12 in the tracks. The first sectors written by write element 220 for a group of concurrently written tracks are indicated with cross-hatching and are numbered with 0. In the embodiment of FIG. 4A, the width of write element 220 is four tracks such that four tracks are concurrently written on disk 214.

Tracks 0 to 3 form a first group of concurrently written tracks, such as first group 226 in FIG. 3. Tracks 4 to 7 form a second group of concurrently written tracks, such as second group 228 in FIG. 3. Tracks 8 to 11 form a third group of concurrently written tracks, and tracks 12 to 15 form a fourth group of concurrently written tracks. Since tracks 216 on disk 214 are circular, the last written sectors which are designated with max, immediately precede the first written sectors designated with 0.

As shown in FIG. 4A, the first sectors written in a first group of concurrently written tracks are offset by two logical sectors from the first sectors written in a previous group of concurrently written tracks. The offset of two logical sectors corresponds to a track skew which accommodates for the time needed for actuator arm 210 to move head 208 from the first group of concurrently written tracks to the second group of concurrently written tracks.

Figure 4B:
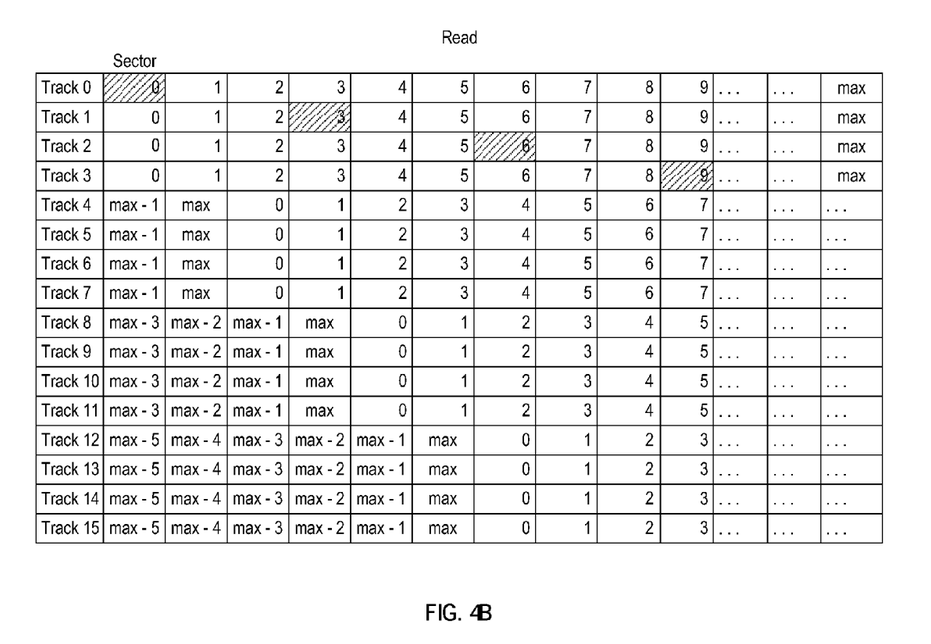
FIG. 4B illustrates a position of a read element according to an embodiment.

FIG. 4B illustrates the position of read element 222 in reading data written by write element 220 in the order shown in FIG. 4A. Sectors with cross-hatching indicate a first read sector in a track. As shown in FIG. 4B, within the first group of concurrently written tracks 0 to 3, the first sector read of a next track is offset by three logical sectors from the first sector read in a previous track. For example, the first sector read in track 0 has logical sector number 0 and the first sector read in track 1 has logical sector number 3. This offset of three logical sectors is greater than the track skew of two logical sectors discussed above with reference to FIG. 4A. By having an offset greater than the track skew, head 208 can ordinarily move from track 0 to track 1 and begin reading data at logical sector number 3 without having to wait for disk 214 to rotate all the way back to logical sector 0 of track 1.

Figure 5A:
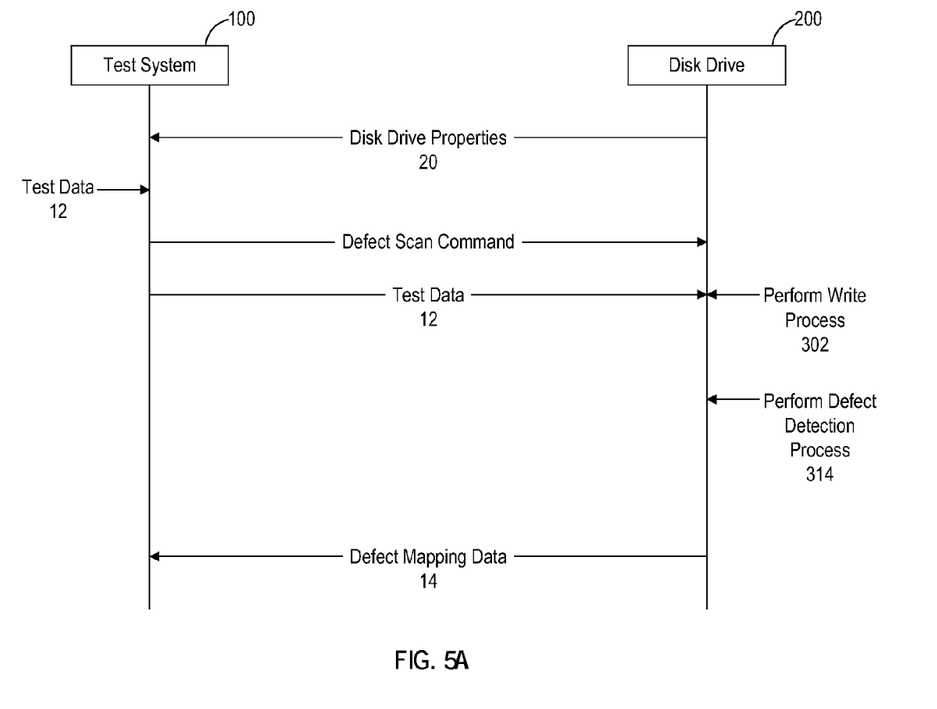
FIG. 5A is a sequence diagram for performing a defect scanning process according to an embodiment.

FIG. 5A is a sequence diagram for performing a defect scanning process according to one example embodiment. The defect scanning process of FIG. 5A can be performed for all possible tracks on disk 214 or for only a subset of tracks on disk 214. For example, the defect scanning process of FIG. 5A may only be performed for an area of disk 214 which has been designated as a shingled zone for overlapping tracks. In such an embodiment, other zones of non-overlapping tracks (i.e., non-shingled zones) can be scanned for defects using conventional defect scanning.

In the embodiment of FIG. 5A, disk drive 200 sends disk drive properties 20 to test system 100 via test system interface 206. Disk drive properties 20 identify disk drive 200 and can provide test system 100 with information about disk drive 200 such as a width of write element 220, a maximum number of tracks 216 that can be written to disk 214, or a maximum number of sectors 214 for a particular track 216.

In one embodiment, test system 100 retrieves test data 12 from data storage 120 and CPU 102 forms a defect scan command based on the test data 12 and the disk drive properties 20. In another embodiment, test data 12 may be in RAM 104 already. Test system 100 sends the defect scan command and test data 12 to disk drive 200 via disk drive interface 122. The defect scan command and test data 12 are received by disk drive 200 via test system interface 206. In response, disk drive 200 performs write process 302 to concurrently write test data 12 in more than one track 216 on disk 214. Write process 302 is described in greater detail below with reference to FIG. 5B.

Continuing with the sequence of FIG. 5A, defect detection process 314 is performed by disk drive 200 after write process 302 has been performed. During defect detection process 314, the data written in write process 302 is read by read element 222 to detect defects on disk 214. More specifically, if an error is encountered while reading a particular sector, that sector is logged as defective in defect mapping data 14. Defect detection process 314 is described in greater detail below with reference to FIG. 5C.

Once defects are mapped, defect mapping data 14 is stored in disk drive 200, such as in a reserved area of disk 214. Optionally, and as shown in the embodiment of FIG. 5A, disk drive 200 sends defect mapping data 14 to test system 100 via test system interface 206 after all of the sectors to be scanned for defects have been read. Defect mapping data 14 can indicate sectors logged as defective during defect detection process 314. As described below with reference to FIG. 5C, defect mapping data 14 can also indicate sectors surrounding defective sectors which have been set as unusable sectors in defect detection process 314.

As understood by those of ordinary skill in the art, the foregoing sequence of FIG. 5A can be modified without departing from the spirit and scope of the present disclosure. For example, in alternative embodiments, defect mapping data 14 can be sent from disk drive 200 as disk drive 200 detects defective sectors during defect detection process 314.

As another example, the defect scanning process of this disclosure can be performed entirely by disk drive 200 without test system 100 or a host computer. In such an example embodiment, memory 204 or a portion of disk 214 can store test data 12, and upon initial start-up, disk drive 200 can perform write process 302 and defect detection process 314 on its own without test system 100 or a host computer.

In addition, in alternative embodiments, write process 302 does not have to be completely performed for all possible tracks on disk 214 before defect detection process 314 begins. For example, a group of four tracks can be written in write process 302 and then one track can be read in defect detection process 314 before writing a second group of four tracks in write process 302. Once all of tracks 216 to be written for testing purposes are indeed written by write process 302, approximately one quarter of written tracks 216 have already been read. The remaining unread tracks are then read in defect detection process 314.

Figure 5B:
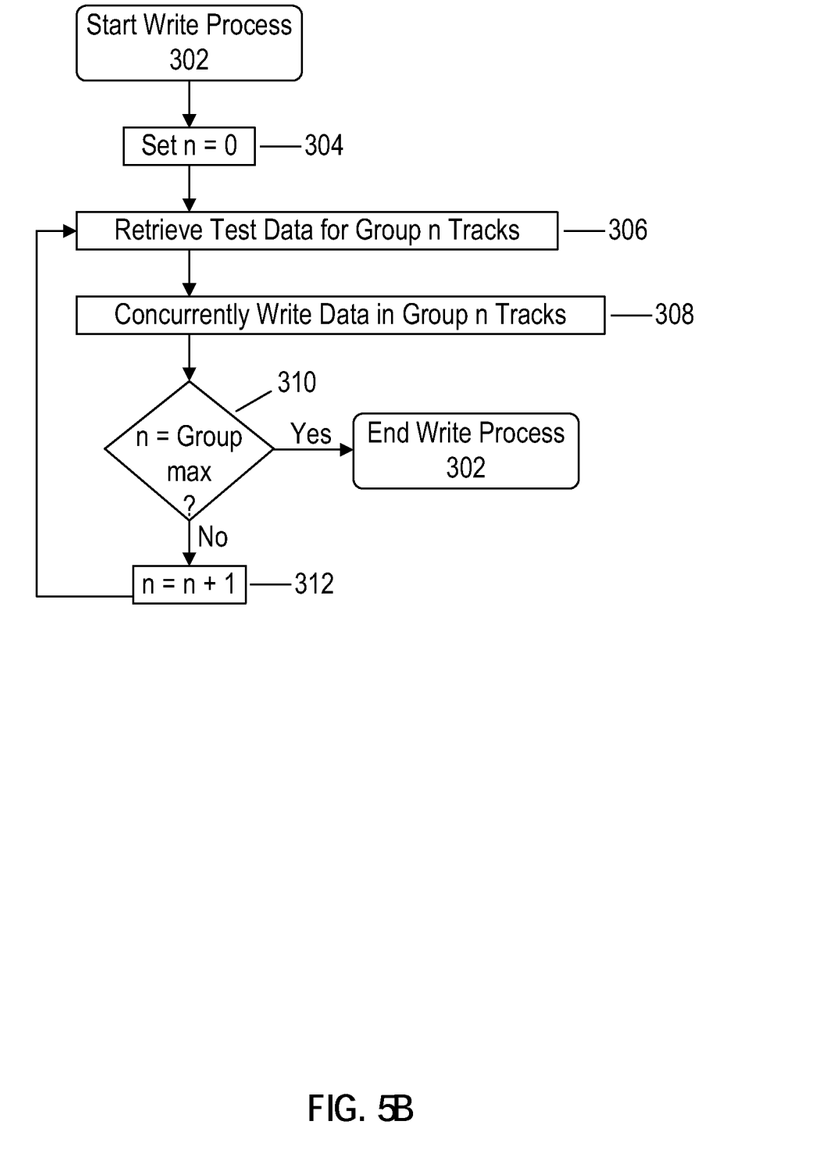
FIG. 5B is a flowchart depicting a write process of the defect scanning process of FIG. 5A according to an embodiment.

FIG. 5B is a flowchart depicting write process 302 in accordance with one embodiment. After starting write process 302, controller 202 of disk drive 200 sets a current group number n to 0 in block 304. The current group number corresponds to a group of concurrently written tracks, such as tracks 0 to 3 in FIG. 4A. In block 306, controller 202 retrieves test data 12 from memory 204 that corresponds to the current group number. Controller 202 controls write element 220 in block 308 to concurrently write the retrieved test data 12 in the tracks corresponding to the current group number. In block 310, controller 202 determines whether the current group number equals a maximum group number. The maximum group number indicates a maximum number of groups of tracks to be written by write process 302. The maximum group number may include all possible tracks of disk 214 or may only include a subset of possible tracks on disk 214. For example, the maximum group number may correspond to a range of tracks of an area of disk 214 designated as a shingled zone for overlapping tracks.

If controller 202 determines in block 310 that the current group number equals the maximum group number, write process 302 ends. If controller 202 determines that the current group number does not equal the maximum group number, the current group number is incremented in block 312, and the process returns to block 306.

Figure 5C:
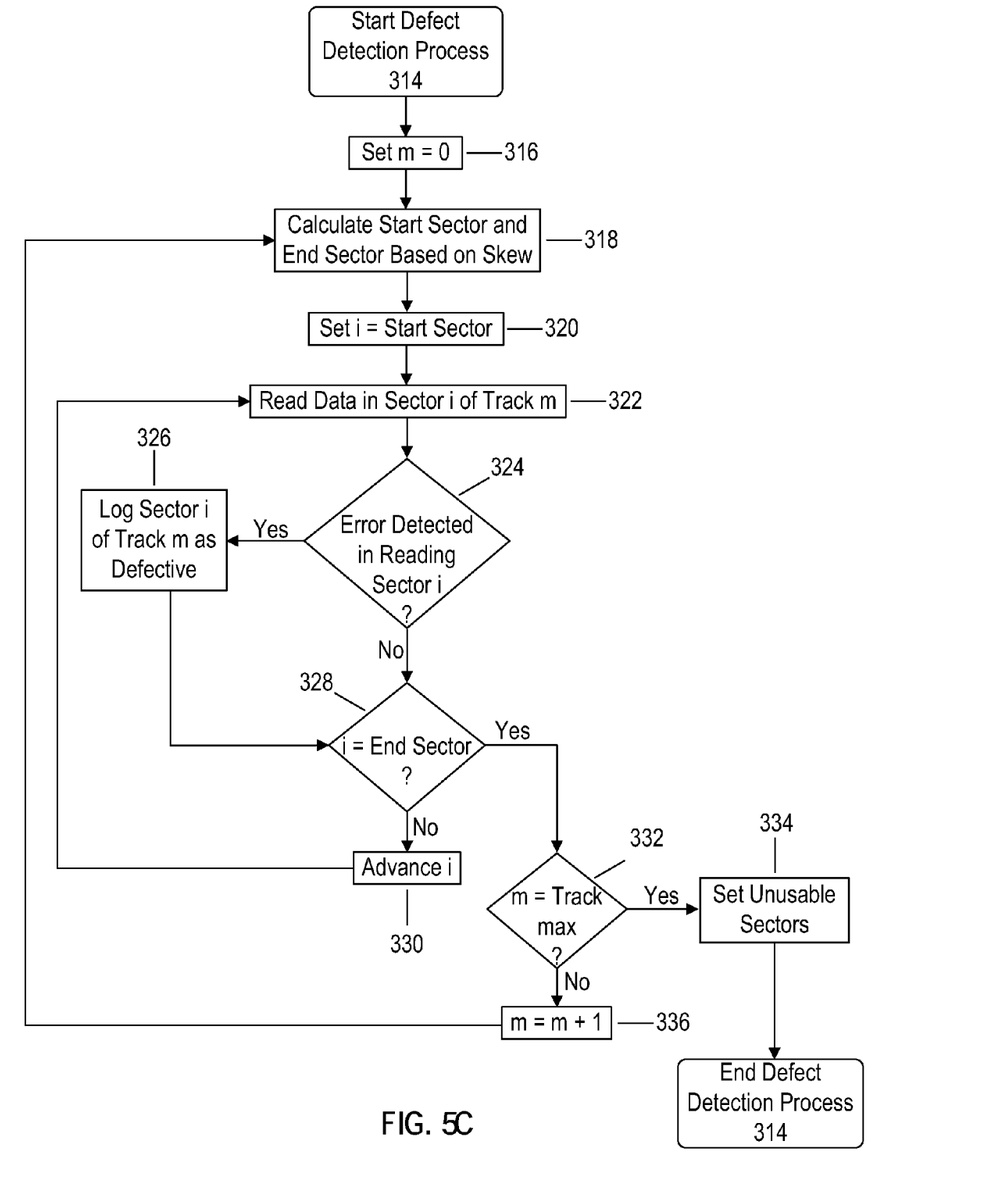
FIG. 5C is a flowchart depicting a defect detection process of the defect scanning process of FIG. 5A according to an embodiment.

FIG. 5C is a flowchart depicting defect detection process 314 from FIG. 5A according to one embodiment. After starting defect detection process 314, controller 202 sets a current track number m to 0 in block 316. In block 318, controller 202 calculates a start sector number and an end sector number based on a track skew. More specifically, controller 202 determines the first and last sectors to be read in a track corresponding to the current track number m. For example, with reference to FIG. 4B discussed above, controller 202 calculates the first sector number for track 2 as 6 and the end sector number for track 2 as 5. The calculation of the first sector number and end sector number in block 318 is based on a track skew so that head 208 can ordinarily begin reading soon after moving to a next track without having to wait for disk 214 to rotate back to logical sector 0 of the previous track.

In block 320, controller 202 sets a current sector number i to the first sector number calculated in block 318. In block 322, controller 202 controls read element 222 to read data written in the sector corresponding to the current sector number of the current track number. In one embodiment, the data read in block 322 is processed by controller 202 without storing the data. In other embodiments, the data read in block 322 can be stored in memory 204 of disk drive 200, or stored in any suitable memory location whether within the disk drive or in the test system.

In block 324, controller 202 determines whether there was an error in reading the sector corresponding to the current sector number. If an error was detected in block 324, controller 202 logs the sector corresponding to the current sector number as defective in defect mapping data 14, which is stored in memory 204. The process then proceeds to block 328.

If an error is not detected in block 324, controller 202 determines in block 328 whether the current sector number equals the end sector number calculated in block 318. If the current sector number does not equal the end sector number, the current sector number is advanced in block 330 and the process returns to block 322. Advancing the current sector number in block 330 takes into account whether the current sector number has reached the maximum sector number for a given track. In this regard, when the current sector number reaches the maximum sector number, the current sector number is advanced for most tracks by setting the current sector number to 0. In the example of FIG. 4B, when the current sector number has reached the "max" sector in track 3, the current sector number is advanced by setting the current sector number to 0 since the end sector number is 8 for track 3.

If controller 202 determines in block 328 that the current sector number equals the end sector number, the process proceeds to block 332 where controller 202 determines whether the current track number equals a maximum track number of written tracks. If so, controller 202 sets unusable sectors in block 334 based on defect mapping data 14. More specifically, controller 202 may set a range of unusable sectors centered on a sector indicated as defective in defect mapping data 14. The unusable sectors set in block 334 can also be logged as part of defect mapping data 14. After setting unusable sectors in block 334, defect detection process 314 ends.

On the other hand, if controller 202 determines in block 332 that the current track number does not equal the maximum track number, the current track number is incremented in block 336 and the process returns to block 318.

Those of ordinary skill in the art will appreciate that the various illustrative logical blocks, modules, and algorithm steps described in connection with the examples disclosed herein may be implemented as electronic hardware, computer software, or combinations of both. Furthermore, the foregoing algorithm steps can be embodied on a computer readable medium which causes a processor or computer to perform or execute certain functions.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A disk drive comprising:
    a disk constructed to have a plurality of tracks on the disk for storing data;
    a head including a write element constructed to concurrently write data in more than one track on the disk and a read element constructed to read data written in tracks on the disk; and
    a controller configured to:
    control the write element to write test data concurrently in more than one track on the disk; and
    control the read element to read data written in the more than one track to detect defects on the disk.

2. The disk drive of claim 1, wherein the write element is a shingled magnetic recording element.

3. The disk drive of claim 1, wherein the more than one track is in an area of the disk designated as a shingled zone for overlapping tracks.

4. The disk drive of claim 1, wherein at least some tracks on the disk include a plurality of sectors for storing data.

5. The disk drive of claim 4, wherein the first sectors written in a first group of concurrently written tracks are offset by a track skew from the first sectors written in a second group of concurrently written tracks.

6. The disk drive of claim 4, wherein the read element is configured to read data written in each of the tracks in a concurrently written group of tracks such that within the group, a first sector read of a next track is offset by an integer number of logical sectors greater than a track skew from a first sector read of a previous track.

7. A defect scanning method for a disk drive, wherein the disk drive includes a disk constructed to have a plurality of tracks on the disk for storing data, the method comprising:
    concurrently writing test data in more than one track on the disk using a head of the disk drive; and
    reading data written in the more than one track to detect defects on the disk.

8. The defect scanning method of claim 7, wherein the test data is concurrently written in the more than one track by a shingled magnetic recording element of the head.

9. The defect scanning method of claim 7, wherein the more than one track is in an area of the disk designated as a shingled zone for overlapping tracks.

10. The defect scanning method of claim 7, wherein at least some tracks on the disk include a plurality of sectors for storing data.

11. The defect scanning method of claim 10, wherein the first sectors written in a first group of concurrently written tracks are offset by a track skew from the first sectors written in a second group of concurrently written tracks.

12. The defect scanning method of claim 10, wherein data is read from each of the tracks in a concurrently written group of tracks such that within the group, a first sector read of a next track is offset by an integer number of logical sectors greater than a track skew from a first sector read of a previous track.

13. A defect scanning method for a disk drive, wherein the disk drive includes a disk constructed to have a plurality of tracks on the disk for storing data, the method comprising:
    receiving a defect scan command and test data from a test system;
    concurrently writing the test data in more than one track on the disk using a head of the disk drive;
    reading data written in the more than one track to detect defects on the disk;
    creating defect mapping data based on errors detected in reading the data written in the more than one track; and
    sending the defect mapping data to the test system.

14. The defect scanning method of claim 13, wherein the test data is concurrently written in more than one track by a shingled magnetic recording element of the head.

15. The defect scanning method of claim 13, wherein the more than one track is in an area of the disk designated as a shingled zone for overlapping tracks.

16. The defect scanning method of claim 13, wherein at least some tracks on the disk include a plurality of sectors for storing data.

17. The defect scanning method of claim 16, wherein the first sectors written in a first group of concurrently written tracks are offset by a track skew from the first sectors written in a second group of concurrently written tracks.

18. The defect scanning method of claim 16, wherein data is read from each of the tracks in a concurrently written group of tracks such that within the group, a first sector read of a next track is offset by an integer number of logical sectors greater than a track skew from a first sector read of a previous track.

19. A test system for performing defect scanning on a disk drive, wherein the disk drive includes a disk constructed to have a plurality of tracks for storing data, the test system comprising:
    a memory storing test data;
    a processor configured to create a defect scan command for the disk drive so that the test data is concurrently written to more than one track on the disk using a head of the disk drive and so that the data written in the more than one track is read by the disk drive to detect defects on the disk; and
    a disk drive interface to send the defect scan command and test data to the disk drive.

20. The test system of claim 19, wherein the processor designates an area of the disk as a shingled zone for overlapping tracks and the more than one track is in the shingled zone.

* * * * *